July 19, 1966 R. P. MILES 3,261,489
APPARATUS AND METHOD FOR MOVING PLATE STRUCTURES
Filed March 23, 1964
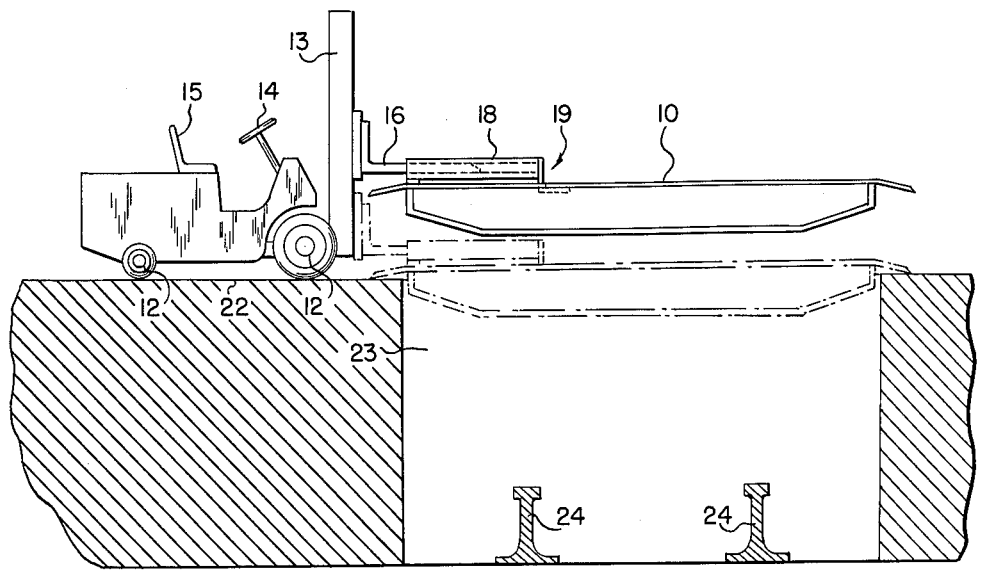
FIG. 1
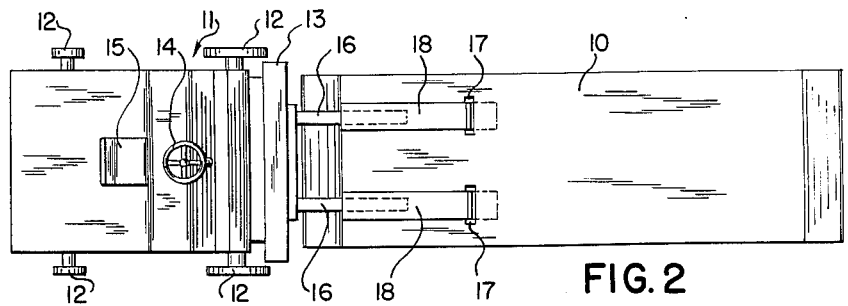
FIG. 2
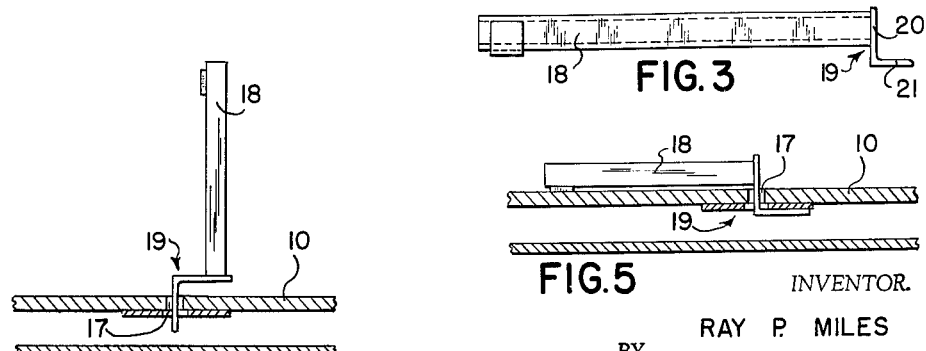
FIG. 3
FIG. 4
FIG. 5
INVENTOR.
RAY P. MILES
BY John Wade Ball Jr.
ATTORNEY.

United States Patent Office 3,261,489
Patented July 19, 1966

3,261,489
APPARATUS AND METHOD FOR MOVING PLATE STRUCTURES
Ray P. Miles, 8575 N. Melody Lane, Northfield, Ohio
Filed Mar. 23, 1964, Ser. No. 353,914
3 Claims. (Cl. 214—620)

This invention relates to an apparatus and method for a lift truck for moving a plate structure from one location to another location.

In the past it has been the practice to move a plate structure from one location to another location by using loops on the end of the plate structure adjacent to the lift truck and to string cables from the top of the lift truck to the front end of the plate structure. This was a cumbersome way of moving a plate structure and involved the use of a lot of equipment.

In the present invention, the plate structure is provided with a pair of spaced slots. A hollow member is disposed on each fork of the lift truck and a hook is fixedly secured to the front end of each hollow member. The plate structure is moved by first placing the hooks in the slots. Then the lift truck is moved forwardly until the forks of the lift truck project into the hollow members. The lift truck, carrying the plate structure, is then driven to the new location. The plate structure is placed on a supporting surface and then the lift truck is moved backwardly so that the forks move out of the hollow members. The hollow members and hooks are then removed from the slots in the plate structure.

An object of the invention is to provide an apparatus to hold a plate structure in a level position while it is being moved from one location to another location.

Another object of the invention is to provide an apparatus that provides less change of dropping the plate structure while it is being moved from one location to another location.

Another object of the invention is to provide an apparatus for moving a plate structure from one location to another location that requires less labor.

Another object is to provide an apparatus that involves less taking off of equipment after the plate structure has been moved to the new location.

A further object is to provide an apparatus that causes less wear on the plate structure when the plate structure is moved from one location to another location.

The foregoing and other objects of the invention will become apparent from the following description taken in conjunction with the accompanying drawings wherein:

FIGURE 1 is a partly side elevational view and a partly vertical sectional view of a railroad track well and a lift truck and a plate structure, FIGURE 2 is a top plan view of the lift truck and the plate structure, FIGURE 3 is a detail side elevational view of one of the hollow members and its lifting hook, FIGURE 4 is a partly side elevational view and a partly vertical sectional view of the first step of moving the plate structure to a new location, and FIGURE 5 is a view similar to FIGURE 4 of the second step of moving the plate structure to a new location.

In the drawings, 10 generally designates a plate structure or bridge that is to be moved from one location to another location. A lift truck generally designated 11 is used and is comprised of wheels 12, a slide 13, a steering wheel 14 and a seat 15. The lift truck 11 also has a pair of horizontally disposed spaced parallel forks 16 that can be moved upwardly and downwardly in the slide 13. The plate structure 10 is provided with a pair of spaced slots 17.

A hollow member 18 is fabricated of metal and surrounds each fork 16 of the lift truck 11. An L-shaped hook generally designated 19 is comprised of arms 20 and 21. A hook 19 is provided for each hollow member 18 and the arm 20 is disposed at right angles to the longitudinal axis of the respective hollow member and extends downwardly from the bottom face of the respective hollow member and is fixedly secured to the front end of the respective hollow member. The arm 21 is integral with the lowermost portion of the arm 20.

The invention is illustrated in connection with a railroad dock 22 having a railroad track well 23 in which are disposed railroad tracks 24. The plate structure 10 has been extended over the railroad track well 23 and has been supported by the dock 22, so that lift trucks could be driven over the plate structure and across the railroad track well. It is now desired to remove the plate structure 10 from the railroad track well 23 and transport it to another location. The method of doing this is as follows: First, the arm 21 of the respective hook 19 is moved vertically downwardly into the respective slot 17 of the plate structure 10 and then the respective hollow member 18 is swung downwardly into engagement with the plate structure 10. The lift truck 11 is then driven to the railroad track well 23 and the forks 16 of the lift truck are then lowered until the forks are opposite the hollow members 18. The lift truck 11 is then driven forwardly so that the forks 16 project into the hollow members 18. The forks 16 are then raised vertically in the slide 13 so that the plate structure 10 is lifted into the air. The lift truck 11 is then driven to the location where it is desired to unload the plate structure 10. The forks 16 are then lowered in the slide 13 until the plate structure 10 contacts the ground. The lift truck 11 is then moved backwardly so that the forks 16 move out of the hollow members 18.

The hollow members 18 and the hooks 19 are then removed manually from the slots 17 in the plate structure 10. This is done by swinging the respective hollow member 18 until it is in a vertical position and then moving the respective hollow members upwardly until the arm 21 moves out of the respective slot 17 in the plate structure 10. The plate structure 10 is now in place on the ground until it is desired to use it again.

The advantages of the invention are as follows: (1) The plate structure is held in a level position until it is moved to the new location. (2) There is very little chance of dropping the plate structure while it is being moved from one location to another location as compared to means used in the past. (3) There is less labor in transporting the plate structure. (4) There is less equipment to take off after the plate structure has been moved to the new location. (5) There is less wear on the plate structure when moving it to the new location.

Dock boards extend between a dock and the floor of a railway freight car. Ramps extend between a dock and the bed of a motor truck. This invention may be used to move both dock boards and ramps by putting slots in the dock boards and ramps.

The embodiment of the invention shown and described is merely illustrative as it is the intention of the applicant to cover every embodiment of the invention that is within the scope of the appended claims.

What is claimed is:

1. Apparatus for moving a plate structure having a pair of spaced slots with a lift truck having a pair of spaced forks from one location to another location comprising a hollow member surrounding each fork and having one end adjacent to the lift truck, and a hook for each hollow member fixedly secured to the other end of the respective hollow member and projecting into the respective slot in the plate structure.

2. Apparatus for moving a plate structure having a pair of spaced slots with a lift truck having a pair of spaced forks, from one location to another location, comprising a hollow member surrounding each fork and having one end adjacent to the lift truck, and an L-shaped hook for each hollow member having one arm at right angles to the longitudinal axis of the respective hollow member and extending downwardly from the bottom face of the respective hollow member and fixedly secured to the other end of the respective hollow member and projecting through the respective slot in the plate structure and the other arm being integral with the lowermost portion of said one arm and disposed in the plate structure and bearing against the plate structure.

3. The method of moving a plate structure having a pair of spaced slots from one location to another location using a lift truck having a pair of spaced forks and a pair of hollow members and a hook fixedly secured to one end of each hollow member comprising the steps of placing the hooks in the slots in the plate structure, moving the lift truck so that the forks move into the hollow members, driving the lift truck to the place of unloading, moving the lift truck backwardly so that the forks move out of the hollow members, and removing the hollow members and hooks from the slots in the plate structure.

No references cited.

GERALD M. FORLENZA, *Primary Examiner.*

M. TEMIN, *Assistant Examiner.*